US012623739B2

(12) United States Patent
Erwin et al.

(10) Patent No.: US 12,623,739 B2
(45) Date of Patent: May 12, 2026

(54) AUTOMATIC AXLE LIFT SYSTEM

(71) Applicant: 4E Ltd., Gatesville, TX (US)

(72) Inventors: Robert A. Erwin, Gatesville, TX (US);
Paul Lovejoy, Gatesville, TX (US)

( * ) Notice: Subject to any disclaimer, the term of this
patent is extended or adjusted under 35
U.S.C. 154(b) by 44 days.

(21) Appl. No.: 18/908,663

(22) Filed: Oct. 7, 2024

(65) Prior Publication Data

US 2026/0097819 A1     Apr. 9, 2026

(51) Int. Cl.
*B62D 61/12*        (2006.01)
*B60W 30/045*       (2012.01)

(52) U.S. Cl.
CPC ......... *B62D 61/125* (2013.01); *B60W 30/045*
(2013.01); *B60W 2540/20* (2013.01)

(58) Field of Classification Search
CPC .............. B62D 61/125; B60W 30/045; B60W
2540/20
See application file for complete search history.

(56) References Cited

U.S. PATENT DOCUMENTS

2012/0123646 A1* 5/2012 Mantini ................ B62D 61/12
73/488

* cited by examiner

*Primary Examiner* — Wade Miles
*Assistant Examiner* — Jerrod Irvin Davis

(57) ABSTRACT

An automatic axle lift system including a first sensor circuit
configured to detect the presence of a brake signal and a turn
signal and, in response, to generate a lift command signal
that lifts an axle or a set of axles of a vehicle. The automatic
axle lift system also includes a second sensor circuit that
detects the lift command signal and, in response, generates
a caution light signal. The automatic axle lift system
includes a third sensor circuit that detects the lift command
signal and, in response, latches the second sensor circuit to
maintain the lift command signal.

7 Claims, 4 Drawing Sheets

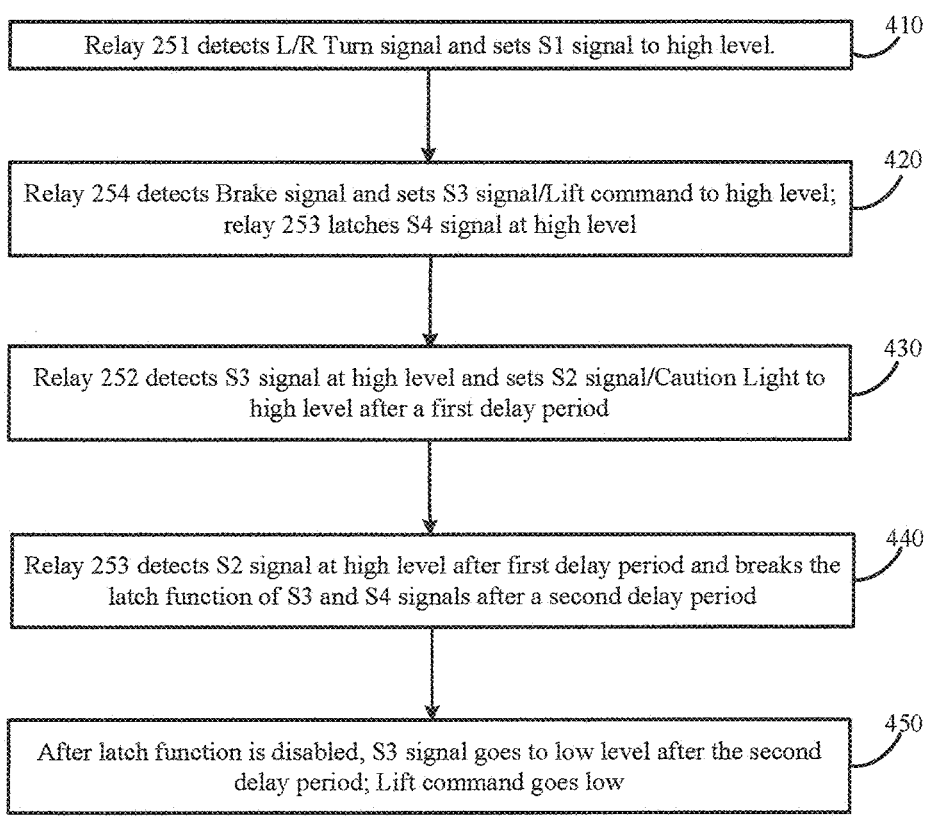

Relay 251 detects L/R Turn signal and sets S1 signal to high level.    410

Relay 254 detects Brake signal and sets S3 signal/Lift command to high level; relay 253 latches S4 signal at high level    420

Relay 252 detects S3 signal at high level and sets S2 signal/Caution Light to high level after a first delay period    430

Relay 253 detects S2 signal at high level after first delay period and breaks the latch function of S3 and S4 signals after a second delay period    440

After latch function is disabled, S3 signal goes to low level after the second delay period; Lift command goes low    450

FIGURE 4

AUTOMATIC AXLE LIFT SYSTEM

TECHNICAL FIELD

The present application relates generally to a control system for automatically raising and lowering an auxiliary axle or multiple auxiliary axles of a vehicle.

BACKGROUND

Heavy load vehicles, such as dump trucks, are often equipped with one or more auxiliar (or lift) axles that may be raised and lowered if load conditions allow it. A lift axle, also called a retractable axle, raises the vehicle tires so that the tires are not touching the road surface. This improves fuel economy by reducing rolling resistance and reduces maintenance and tire wear. However, lifting the axle also increases road wear.

A lift axle may be fixed or steerable. A steerable axle has a pivoting mechanism to allow the axle wheels to turn themselves to better follow the curve without sliding sideways, resulting in better handling and control. Failure to lift an axle, particularly a fixed axle, during a tight turn causes the wheels to be dragged sideways on the pavement, damaging both the road and the tires.

A lift axle may be lifted by means of a manual switch when the vehicle approaches a turn, such as at an intersection. However, after the turn is completed, the driver may forget to lower the lift axle again. This is particularly true if the driver must wait for a long duration for a traffic light to change. Thus, a manual axle lift system relies on the driver to remember to both raise and lower the lift axle.

Thus, there is a need for an automatic system for raising and lowering an auxiliary (or lift) axle of a vehicle. There is a need for an automatic system for raising and lowering an auxiliary (or lift) axle that requires no driver interaction.

SUMMARY

It is a primary object of the present disclosure to provide an automatic axle lift system comprising: i) a first sensor circuit configured to detect the presence of a brake signal and a turn signal and, in response, to enable a lift command signal that lifts an axle of a vehicle; ii) a second sensor circuit configured to detect the lift command signal and, in response, to enable a caution light signal; and iii) a third sensor circuit configured to detect the lift command signal and, in response, to latch the first sensor circuit to maintain the lift command signal. The third sensor circuit is further configured to detect the caution light signal and, in response, to disable the latch of the first sensor circuit, thereby disabling the lift command signal.

In one embodiment, the second sensor circuit enables the caution light signal after a first delay period.

In another embodiment, the third sensor circuit disables the latch of the first sensor circuit after a second delay period after detecting the caution light signal.

In still another embodiment, the first sensor circuit includes a first relay that is activated by the turn signal.

In yet another embodiment, the first sensor circuit further includes a second relay that is activated by the brake signal.

In a further another embodiment, the second sensor circuit includes a third relay that is activated by an output of the second relay.

In a still further embodiment, the third sensor circuit includes a fourth relay that is activated by an output of the third relay.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a flow diagram illustrating the operation of an automatic axle lift system according to the principles of the disclosure.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged vehicle having a lift (or auxiliary) axle/axles.

The purpose of the automatic axle lift system disclosed herein is to reduce excess wear and tear on the tires, bearings and hubs of the lift axle caused by lateral stresses during sharper turns when the truck is loaded and the axle deployed down. The automatic axle lift system does this by automatically raising the lift axle for a short time period while the turn is being made. Manual intervention by the truck driver is not required, thereby allowing the driver to focus on the driving workload and not sacrificing safety due to driver distraction related to manually controlling the raising and lowering of the lift axle.

The automatic axle lift system is triggered by normal driving inputs of the truck driver, such as turn signal activation and application of the brakes. Not only is driver workload not impacted but the driver does not need to remember to manage the lift axle.

Figure 1:
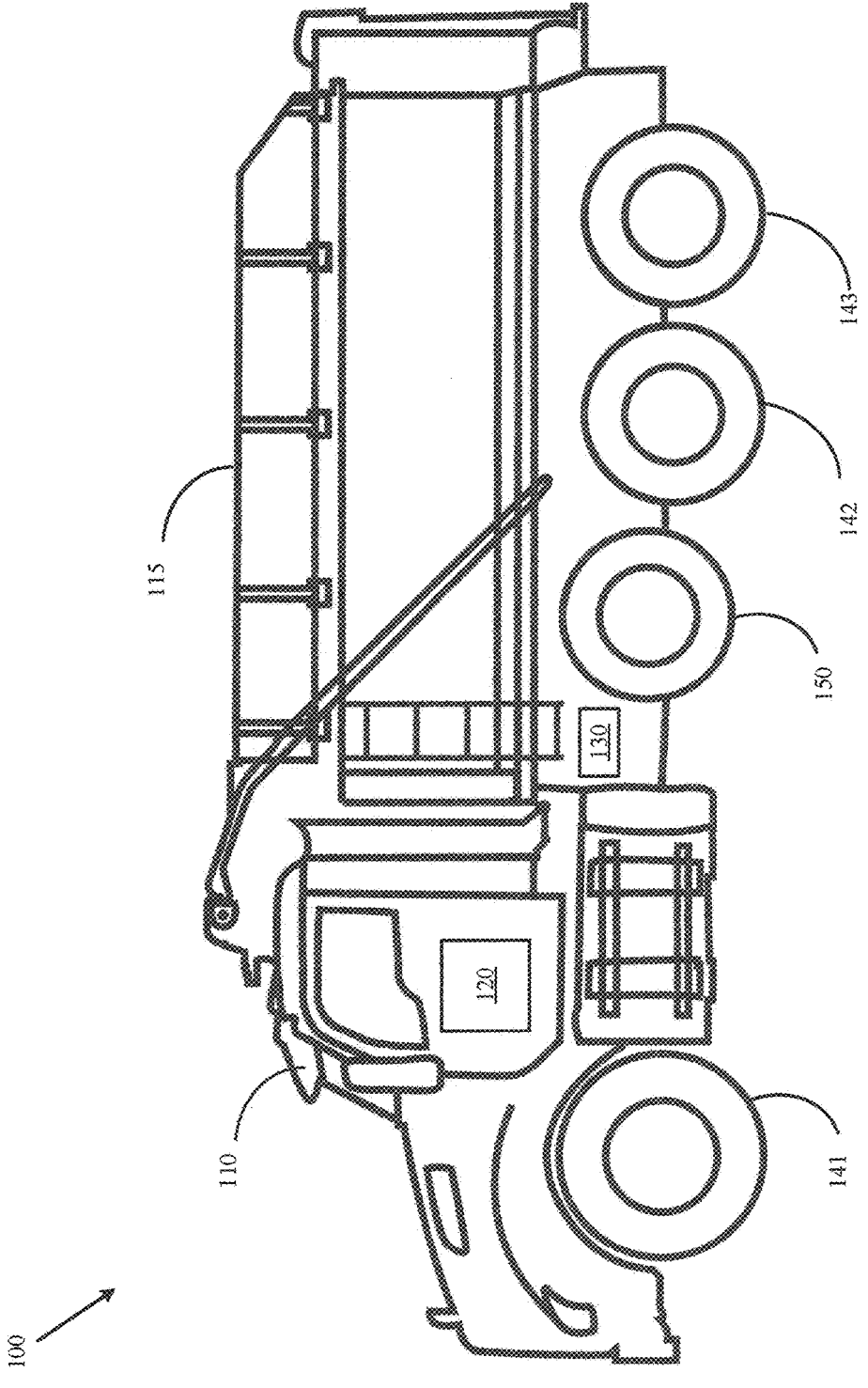
FIG. 1 is an illustration of a dump truck equipped with an automatic axle lift system according to the principles of the disclosure.

FIG. 1 is an illustration of a dump truck 100 equipped with an automatic axle lift system 120 according to the principles of the disclosure. Dump truck 100 includes a cab 110, an open-box bed 115, which is hinged at the rear and equipped with hydraulic rams to lift the front, allowing the material in the box bed 115 to be dumped on the ground behind dump truck 100 at the site of delivery. Dump truck 100 includes four sets of axles. A front axle supports the steering tires, such as example steerable tire 141. A first rear axle supports, for example, two or four fixed tires, including example tire 142. A second rear axle supports, for example, two or four fixed tires, including example tire 143.

Finally, a lift (or auxiliary) axle supports an additional two or four tires, including example tire 150, which is shown in a raised position. The lift axle may be raised and lowered by an axle lift valve 130 that is controlled by the automatic axle lift system 120, which may be in the cab 110 of truck 100.

Figure 2:
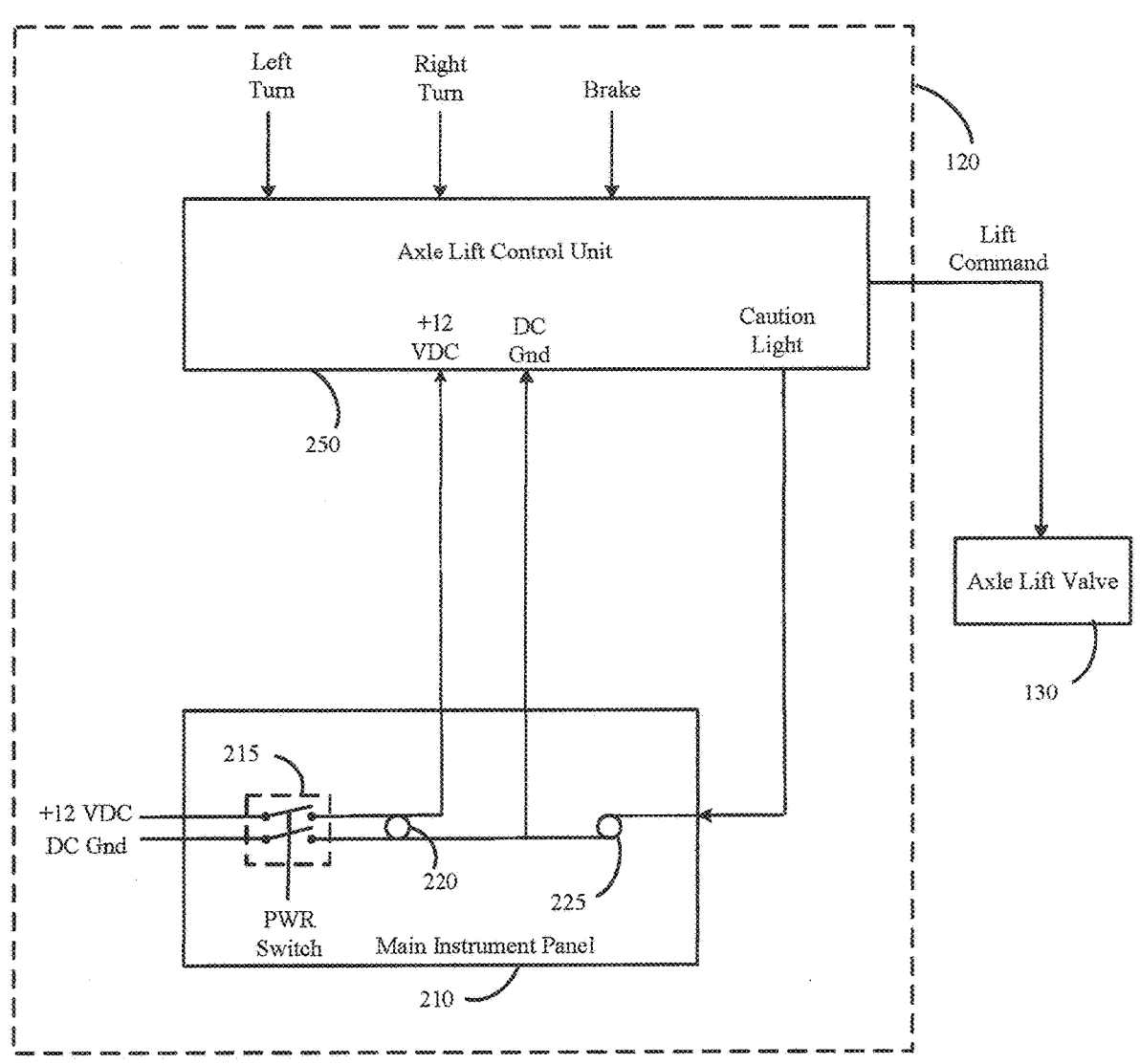
FIG. 2 is a schematic of an automatic axle lift system according to the principles of the disclosure.
Figure 3:
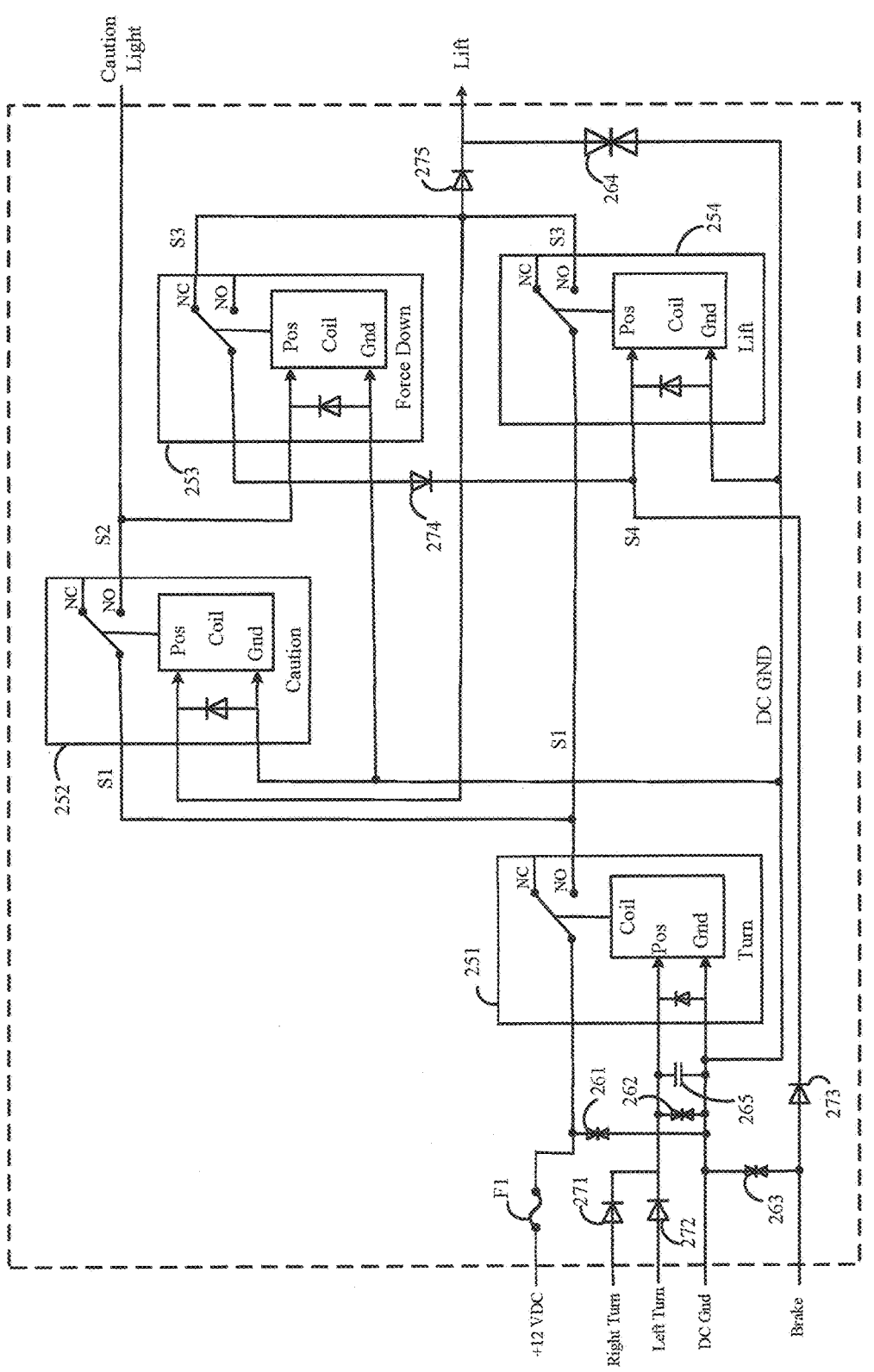
FIG. 3 is a schematic of an axle lift control unit according to the principles of the disclosure.

FIG. 2 is a schematic of the automatic axle lift system 120 according to the principles of the disclosure. The automatic axle lift system 120 includes a main instrument panel 210 and an axle lift control unit 250. FIG. 3 is a schematic of the axle lift control unit 250 according to the principles of the disclosure.

Main instrument panel 210 is in the cab within easy reach of the driver, such as in, or on top of, the dashboard. Main instrument panel 210 receives +12 VDC power and has a DC Gnd connection. Main instrument panel 210 includes a switch 215 that the driver manually closes to activate the automatic axle lift system 120. Closing switch 215 couples the +12 VDC power and the DC Gnd Return connection to axle lift control unit 250.

Switch 215 is a double pole, single throw (DPST), so that +12 VDC and DC Gnd are both switched simultaneously. Switching the DC Gnd OFF as part of the power-off action is necessary to prevent the turn signal relay 251 and lift relay 254 in FIG. 3 from energizing when the unit 250 is turned OFF and not in use.

The axle lift control unit 250 has five (5) electrical input signal and two (2) electrical output signals that interface with the truck electrical system, including +12 VDC (input), DC Ground (input), Left (L) Turn (input), Right (R) Turn (input), Brake (input), Caution Light (output), and Lift Command (output). The Lift Command signal is coupled to the axle lift valve 130 and controls the raising and lowering of the lift axle.

Switch 215 also couples +12 VDC and DC Gnd to green indicator light 220, which may be an LED or otherwise. When switch 215 is closed, green indicator light 220 is turned ON and is visible to the driver on the exterior of main instrument panel 210.

Yellow indicator light 225, which may be an LED or otherwise, is mounted on the main instrument panel. It is turned on by the Caution Light signal from axle lift control unit 250 and illuminates after two (2) minutes into the lift cycle. Light 225 alerts the driver that there is a one (1) minute delay until the lift axle automatic lowers.

Using the input signals, axle lift control unit 250 applies hard-wired relay logic to assess driver inputs and determine when or if the lift axle should be raised for a turn, which is communicated to the axle lift valve 130 by the Lift Command signal. Axle lift control unit 250 incorporates design for Fail-Safe consideration as well as filtering to ensure switching transients cannot make their way from unit 250 onto existing truck electrical/electronic circuits and systems. Additionally, unit 250 incorporates overcurrent protection where the +12 VDC input passes through a properly sized fuse F1. Fuse F1 provides protection for the +12 VDC source voltage of axle lift control unit 250 in the event of shorting or overcurrent on the unit 250 circuit board itself, or downstream from the lift valve 130 and associated wiring.

Once powered up, axle lift control unit 250 looks for two key inputs to determine if or when the lift axle is to be raised for a turn: 1) a Left Turn signal or a Right Turn signal and 2) a Brake signal. The Left Turn signal and the Right Turn signal are logic ORed together by diodes 271 and 272. The ORed output of diodes 271 and 272 are logic ANDed with the Brake signal by relay 254 to generate the Lift Command at the output of unit 250.

The Left or Right Turn Signal is a "master" with respect to the Brake signal because the Turn signal is the only one that can terminate the lift and force the axle to lower again. It is not relevant which of these two signals (Brake or Turn) arrives first. But both signals must be active simultaneously for the lift action to be commanded. Once a Turn signal and the Brake signal are both active and detected, the Brake signal can drop out and the lift action will continue. However, the master Turn Signal must remain active and present for lift to continue and hold. Otherwise, once the Left Turn signal or Right Turn signal drops off, the lift axle will lower at any time in the lift time sequencing.

The disclosed system includes driver induced and unit intended designed time delays in the sequencing of events.

First, as stated in the description of the Turn Signal and Brake signal above, both must be present at the AND function circuit but there can be delays between application of braking and the turn signal switch by the driver that are driver driven delays not generated by the unit.

Second, once the Lift Command becomes active and the lift axle is raising, the driver may have, for example, three (3) minutes to complete the turn. The driver can complete the turn and either his turn signal automatically shuts off or he manually shuts it off in less than 3 minutes at which time the lift axle lowers down because the Left (or Right) turn signal is the master and terminates the lift operation. However, in the event the driver makes the turn and leaves the turn signal on, the axle lift control unit 250 automatically lowers the lift axle after the 3-minute delay.

Third, after an example two (2) minute delay, the Caution Light signal may illuminate an instrument panel mounted caution light 225 to alert the driver the axle will lower automatically in one (1) more minute. The driver can then decide to let the axle lift control unit 250 continue its countdown and subsequent action or intervene to get, for example, three (3) more minutes (e.g., if driver is stuck at a long duration red light). The driver can reset for another 3-minute cycle by simply turning the turn signal off, then back on and tapping the brake pedal. This can be done multiple times as needed.

Axle lift control unit 250 includes four relays 251-254 that provide the logic and time delays for basic function of axle lift control unit 250. Each of relays 251-254 includes an internal coil that closes the switch from the normally closed (NC) position to the normally open (NO) position when the coil is energized. In an example embodiment, each of relays 251-254 also includes an internal flyback diode (unlabeled) that suppress switching transients.

Axle lift control unit 250 includes four back-to-back Zener diodes 261-264 that protect the input and output signals that connect to existing truck electrical systems and power. Zener diodes 261-264 are a second layer of protection beyond the protection provided by the relay flyback diodes for suppressing switching transients and protecting existing truck electronics and electrical systems.

Turn signal relay 251 is a single pole, double throw (SPDT) relay with no time delay function. It is neither "delay on make" (DOM) nor "delay on break" (DOB). Turn signal relay 251 is energized when the unit 250 master power switch 215 in ON and a Left Turn or Right Turn signal is present at the positive side of the relay coil. Turn signal relay 251 has two purposes: one purpose is to provide a high current +12 VDC Turn signal (S1 signal) through the NO (normally open) contact that ultimately is sent to the lift valve 130. The second purpose is keeping a low load as seen upstream to the turn signal system of the truck (relay coil resistance vs. much higher lift valve coil resistance).

The Caution Light relay 252 is a SPDT DOM relay that generates a first delay before throwing the switch. In an example embodiment, the first delay value may be a two (2) minute delay. After relay 252 is energized by the S3 signal at the NO output of relay 254, the coil in relay 252 will delay for two minutes before closing the switch to the NO position. At this point, the S1 signal (+12 VDC) appears at the NO output (S2 signal) of relay 252. The S2 signal is the Caution Light output signal of unit 250. A secondary purpose of relay 252 is sending the 2-minute delayed Caution Light signal to the input of Force Down relay 253. Relay 253 generates a second DOM delay. In an example embodiment, the second delay may be a one (1) minute delay that must expire before relay 253 switches from the NC position to the NO position and forces lift relay 254 to lower the lift axle.

Lift axle relay 254 is a SPDT relay having no delay that raises the lift axle when all logic has determined conditions are correct to do so. Relay 254 latches itself via feedback through the NC contacts of Force Down relay 253. The latching holds relay 254 energized even when the Brake signal drops out after the initial presence that energized relay 254. The Lift Command output of relay 254 (S3 signal) is +12 VDC that originated from Turn signal relay 251. Relay 254 performs the AND function of the Brake signal and the OR output of the Left and Right turn signals.

The Force Down relay 253 lowers the lift axle after the combined first and second delays (e.g., 3 minutes) have expired. Relay 253 does this by breaking the Brake latch function of relay 254. The feedback latch function is accomplished by taking the S3 signal output of relay 254 and routing it back to its coil positive side input through the NC contacts of relay 253. Relay 253 has a one (1) minute delay before breaking the relay 254 latch and forcing the lift axle down. The one-minute delay summed with the two-minute delay of relay 252 provides the combined three-minute delay.

Diodes 271-275 are reverse bias blocking diodes that couple the Left Turn signal and the Right Turn signal. Either turn signal may be accepted by Turn Signal relay 251. Additionally, they prevent discharge of capacitor 265 back to a source impedance, such as turn lamps.

Diode 273 is a reverse bias protection diode to prevent sinking of current back into the brake system or brake lamps. Excess current sink and voltage drop may risk breaking the Brake Latch on the Lift relay 254. Inadvertent illumination of the truck brake lamps is also prevented.

Diode 275 is a reverse bias blocking diode to prevent +12 VDC at lift valve from entering the Aux Axle Saver board when existing truck systems activate the Lift valve output, when axle lift control unit 250 is powered down or operational.

Diode 274 is a reverse bias blocking diode that ensures relay 253 is only a latch break and cannot also pass +12 VDC brake voltage directly to the Lift Command output via its NC contact. This function is in effect whether the unit 250 is powered ON or OFF.

Electrolytic capacitor 265 is the major component of the "sample & hold" circuit that takes a one (1) pulse-per-second (PPS), 50% duty cycle, Left Turn signal (or Right Turn signal) input and converts it to a near steady state for energizing relay 251. Depending on the coil resistance of relay 251, capacitor 265 may be sized for an RC time constant of 0.5 seconds.

According to the principles of the present disclosure, relay 251 and relay 254 comprise a first sensor circuit configured to detect the presence of the Brake signal and either the Right Turn signal or the Left Turn signal and, in response, to enable a Lift Command signal that lifts an axle of a vehicle. Relay 252 comprises a second sensor circuit configured to detect the Lift Command signal and, in response, to enable a Caution Light signal after a first delay period. Relay 253 comprises a third sensor circuit configured to detect the Lift Command signal and, in response, to latch the first sensor circuit to maintain the Lift Command signal. The third sensor circuit is further configured to detect the Caution Light signal after the first delay and, in response, to break the latch function after a second delay and disable the Lift Command signal.

FIG. 4 is a flow diagram illustrating the operation of an automatic axle lift system according to the principles of the disclosure. In step 410, relay 251 detects a Left or a Right Turn signal and sets S1 signal to a high level (e.g., +12 VDC). In step 420, relay 254 detects the Brake signal and sets the S3 signal (Lift command) to a high level. Relay 253 automatically latches the S4 signal to the high level. In step 430, relay 252 detects the S3 signal at the high level and sets the S2 signal (Caution Light) to a high level after a first delay period.

In step 440, relay 253 detects the S2 signal at a high level after the first delay period and breaks the latch function of the S3 and S4 signals after a second delay period. In step 450, after the latch function is disabled, the S3 signal goes to a low level after the second delay period. As a result, the Lift command goes low, thereby lowering the auxiliary axle.

In addition to the primary benefit axle lift control unit 250 provides-reducing large costs of lift axle repairs and maintenance and customer dissatisfaction, the disclosed design also reduces risk of parts and component obsolescence by utilizing all component level parts with no off-the-shelf prefabricated circuit boards or other electrical assemblies. Manufacturer up-front costs for huge bulk buys or risk of excess warehoused off-the-shelf products at end of production can be very costly and wasteful. By utilizing only component level parts (relays, resistors, switches, diodes, capacitors, etc.) that have been around for many decades and will be for many more, costs due to obsolescence will be minimal and never drive bulk buys any greater than what is needed to meet production line demand.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An automatic axle lift system comprising:
a first sensor circuit configured to detect the presence of a brake signal and a turn signal and, in response, to enable a lift command signal that lifts an axle of a vehicle;
a second sensor circuit configured to detect the lift command signal and, in response, to enable a caution light signal; and
a third sensor circuit configured to detect the lift command signal and, in response, to latch the first sensor circuit to maintain the lift command signal, wherein the third sensor circuit is further configured to detect the caution light signal and, in response, to disable the latch of the first sensor circuit, thereby disabling the lift command signal.

2. The automatic axle lift system as set forth in claim 1, wherein the second sensor circuit enables the caution light signal after a first delay period.

3. The automatic axle lift system as set forth in claim 2, wherein the third sensor circuit disables the latch of the first sensor circuit after a second delay period after detecting the caution light signal.

4. The automatic axle lift system as set forth in claim 3, wherein the first sensor circuit includes a first relay that is activated by the turn signal.

5. The automatic axle lift system as set forth in claim 4, wherein the first sensor circuit further includes a second relay that is activated by the brake signal.

6. The automatic axle lift system as set forth in claim 5, wherein the second sensor circuit includes a third relay that is activated by an output of the second relay.

7. The automatic axle lift system as set forth in claim 6, wherein the third sensor circuit includes a fourth relay that is activated by an output of the third relay.

\* \* \* \* \*